Patented June 7, 1927.

1,631,829

UNITED STATES PATENT OFFICE.

LAUREL A. NEGLY AND PERCY S. BLACK, OF FORT WORTH, TEXAS.

CEREAL-BEVERAGE COMPOUND.

No Drawing. Application filed November 4, 1926. Serial No. 146,282.

Our invention relates to a novel composition of matter and more particularly to a cereal beverage compound which may be combined with water to produce a healthful and nourishing beverage.

It is an object of the present invention to produce a cereal beverage compound having healthful and nutritious qualities and possessing the aroma, flavor, and other pleasing characteristics of coffee but which is free of injurious and disagreeable ingredients such as the caffeine contained in coffee, and which, when combined with water, and if desired, with sugar, and cream or milk in a manner similar to coffee, will produce a beverage so closely resembling coffee in taste, aroma, etc. as to be hardly distinguishable therefrom. It is a further object of our invention to produce a beverage compound which may be boiled down with water to form a syrup, the syrup being such that it may be suitably diluted with water (sugar and cream or milk being added, if desired) to instantly form a beverage closely resembling coffee but free of caffeine.

A further object of our invention resides in the provision of a beverage compound capable of conversion to a syrup possessing a pleasing taste characteristic of coffee, and which may be used as a flavoring extract.

It has previously been proposed to prepare coffee substitutes employing as primary materials roasted grains or cereals such as wheat, rye, corn, barley, etc. but such substitutes are largely characterized by an unpleasant grainy and bitter taste. Such substitutes also are frequently flat and insipid in taste. It is therefore a further object of our invention to provide beverage compounds having roasted cereals as basic ingredients but which are devoid of the disagreeable taste referred to and which have a pleasant taste resembling that of coffee.

We have found that by the presence of a small portion of roasted peanuts, and preferably other substances specified hereinafter, in a cereal beverage compound having a roasted cereal or grain as a primary constituent the grainy and unpleasant taste due to the cereal is counteracted, the roasted peanuts and other ingredients in the meantime imparting to the beverage extract a pleasant aroma and coffee taste. Our invention then comprises a beverage compound containing roasted cereal or grain and roasted peanuts and preferably we employ as the cereal a mixture of whole roasted wheat and whole roasted rye. The proportions of wheat and rye present in the composition may of course be varied but we have found that when employed in equal amounts a better grade of product is produced. If desired, a small amount of roasted barley may be added for the purpose of strengthening the taste. Likewise chicory may be employed as an ingredient of the mixture to add to or strengthen the coffee taste thereof.

Our composition may be further improved in taste and in healthful and nutritious qualities by the introduction thereinto of ground raisins, ground figs, malt syrup or any other syrup, and wheat bran, the bran also serving an additional purpose referred to hereinafter. The compound may be suitably sweetened by including brown sugar and honey. A small amount of licorice is also preferably added for the purpose of removing or counteracting the bitterness due to the grains.

Our preferred composition consists of the following ingredients in the proportions stated and has been found to be healthful and nutritious and to very closely resemble coffee in taste and aroma although it is to be understood that the invention is not limited thereto:

| | Ounces. |
|---|---|
| Whole roasted wheat | 2 |
| Whole roasted rye | 2 |
| Whole roasted barley | 1/6 |
| Whole roasted peanuts | 1/2 |
| Chicory | 1 1/2 |
| Wheat bran | 4 |
| Brown sugar | 1 |
| Honey | 1/2 |
| Malt syrup | 1/4 |
| Ground raisins | 1/2 |
| Ground figs | 1/4 |
| Licorice | 1/16 |
| Water | 3 |

In preparing our preferred cereal beverage compound, the whole wheat, rye, barley, and peanuts are each roasted separately at a sufficient temperature and for a sufficient time to bring the grains to a uniform dark rich brownish color and are then ground or cut into pieces and thoroughly mixed in the proportions stated. Raisins and figs ground into fine particles are then added to water, brown sugar, honey, and malt syrup, if all these materials are to be included in the composition, and the mixture boiled until a solution or homogeneous liquid mass is obtained. Licorice is then added to the resultant liquid. The liquid is now mixed with bran, the bran acting as a filler and absorbent for the liquid ingredients as well as imparting healthful properties to the ultimate product. The bran with its absorbed liquid is now roasted at a temperature and for a time sufficient to produce a dark rich brown colored mass which is then thoroughly agitated in any suitable manner with the roasted wheat, rye, barley, peanuts, and chicory to produce a homogeneous mixture of a granular nature. This mixture closely resembles ground coffee in taste, aroma, and appearance and furnishes a healthful beverage when dissolved in water or the like.

To prepare a beverage from our improved product, a small amount of the same, depending on the strength desired, is merely boiled with water for about ten minutes in a coffee pot or percolator, sugar and cream or milk being added, if desired. A tablespoonful of the compound to one cup of water furnishes a beverage of suitable strength. The resultant beverage so closely resembles coffee in taste and aroma as to be hardly distinguishable therefrom, possesses healthful and nutritious qualities, and is free of the injurious effects due to the presence of caffeine in coffee. Our beverage compound is much cheaper than coffee and may be blended with high grade coffee to reduce the cost and injurious effects of the same without destroying its pleasant taste and aroma, or it may be blended with cheaper grades of coffee to improve the same in taste and healthful qualities.

Our improved beverage compound may be worked up into a syrup by boiling in water, straining to remove suspended particles, reboiling, again straining, and so on until a syrup of the desired consistency is obtained. Suitable reagents may be added to the boiling mixture to prevent fermentation and to effect preservation. Such reagents are well known in the art. The syrup when suitably diluted with water, either hot or cold, instantly furnishes a pleasant beverage, boiling being unnecessary. When mixed with sweetening syrups such as simple sugar syrup, the syrup prepared from our beverage compound as above described forms an excellent flavoring extract having a pleasant coffee taste which may be used as a flavoring in the manufacture of ice cream or it may be dispensed at soda fountains in the preparation of sundaes or for making instantaneous drinks or it may find general application in the flavoring of food products.

It will be apparent that various changes and modifications may be made in the novel product herein disclosed without departing from the spirit or scope of the invention as defined in the appended claims.

Having described our invention, what we claim and desire to secure by Letters Patent of the United States is:

1. A cereal beverage compound comprising whole roasted cereal and roasted peanuts.

2. A cereal beverage compound comprising a major proportion of whole roasted cereal and a minor proportion of roasted peanuts.

3. A cereal beverage compound comprising whole roasted wheat, whole roasted rye, and roasted peanuts.

4. A cereal beverage compound comprising whole roasted cereal, roasted peanuts, and licorice.

5. A cereal beverage compound comprising whole roasted wheat, whole roasted rye, roasted peanuts, and licorice.

6. A cereal beverage compound comprising whole roasted wheat, whole roasted rye, whole roasted barley, roasted peanuts, wheat bran, brown sugar, honey, malt syrup, raisins, figs, licorice, and water.

7. A cereal beverage compound comprising two ounces whole roasted wheat, two ounces whole roasted rye, one-sixth ounce whole roasted barley, one-half ounce roasted peanuts, four ounces wheat bran, one ounce brown sugar, one-half ounce honey, one-fourth ounce malt syrup, one-half ounce ground raisins, one-fourth ounce ground figs, one-sixteenth ounce licorice, and three ounces water.

8. A cereal extract comprising a mixture of whole roasted cereal and roasted peanuts boiled down with water to a syrupy liquid.

9. A cereal extract comprising a mixture of whole roasted cereal, roasted peanuts, and licorice boiled down with water to a syrupy liquid.

10. A cereal extract comprising a mixture of whole roasted wheat, whole roasted rye, whole roasted barley, roasted peanuts, wheat bran, brown sugar, honey, malt syrup, raisins, figs, and licorice boiled down with water to a syrupy liquid.

11. A cereal extract comprising a mixture of two ounces whole roasted wheat, two ounces whole roasted rye, one-sixth ounce whole roasted barley, one-half ounce roasted peanuts, four ounces wheat bran, one ounce brown sugar, one-half ounce honey, one-fourth ounce malt syrup, one-half ounce ground raisins, one-fourth ounce ground figs, and one-sixteenth ounce licorice boiled down with water to a syrupy liquid.

In testimony whereof we affix our signatures.

LAUREL A. NEGLY.
PERCY S. BLACK.